July 23, 1935.  T. S. GRIMES  2,009,047
HULLER FEEDER OR THE LIKE
Filed Aug. 29, 1933  4 Sheets-Sheet 1

Inventor
Thaddeus S. Grimes
By Eugene Stevens
His Attorney

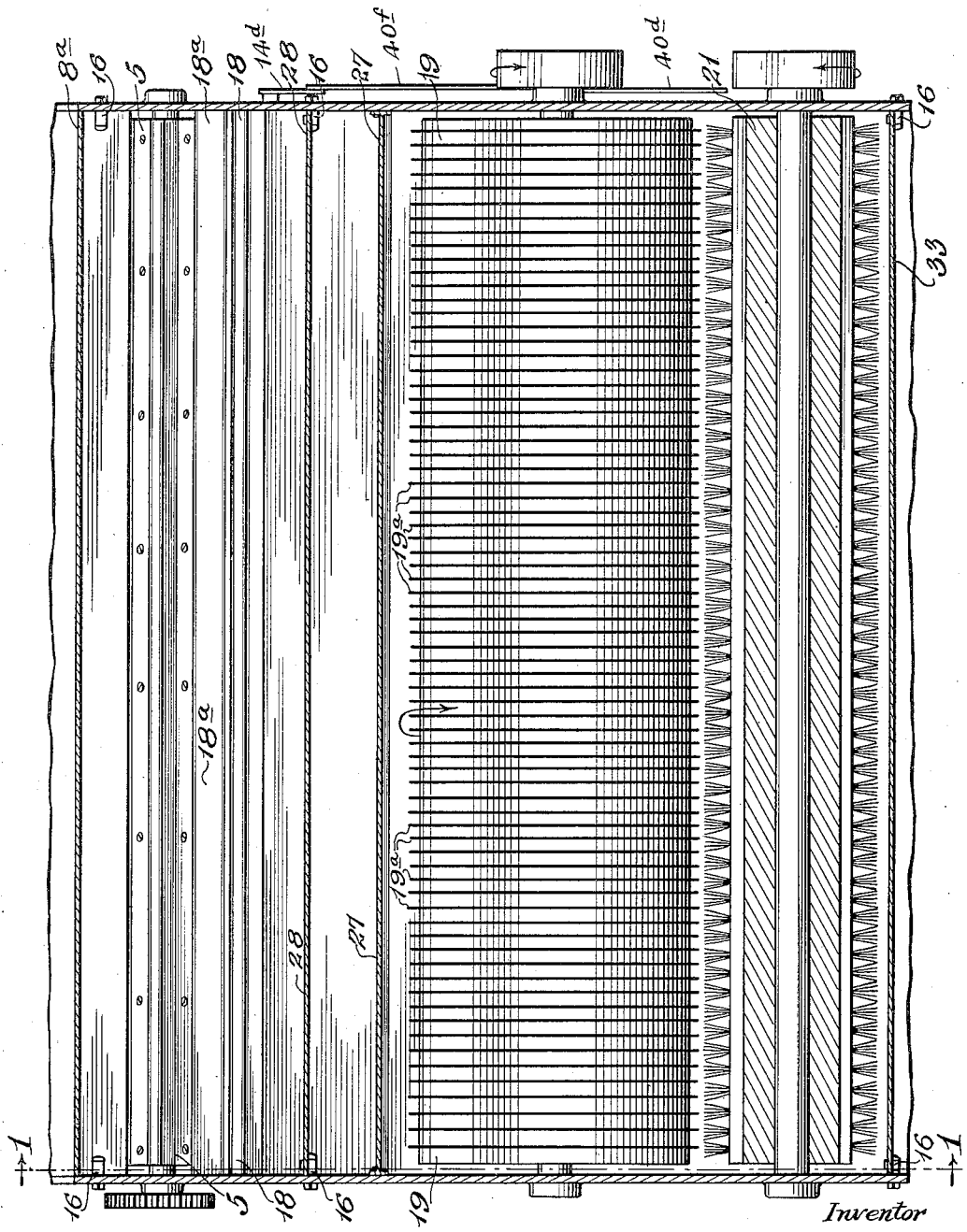

July 23, 1935. T. S. GRIMES 2,009,047
HULLER FEEDER OR THE LIKE
Filed Aug. 29, 1933 4 Sheets-Sheet 3
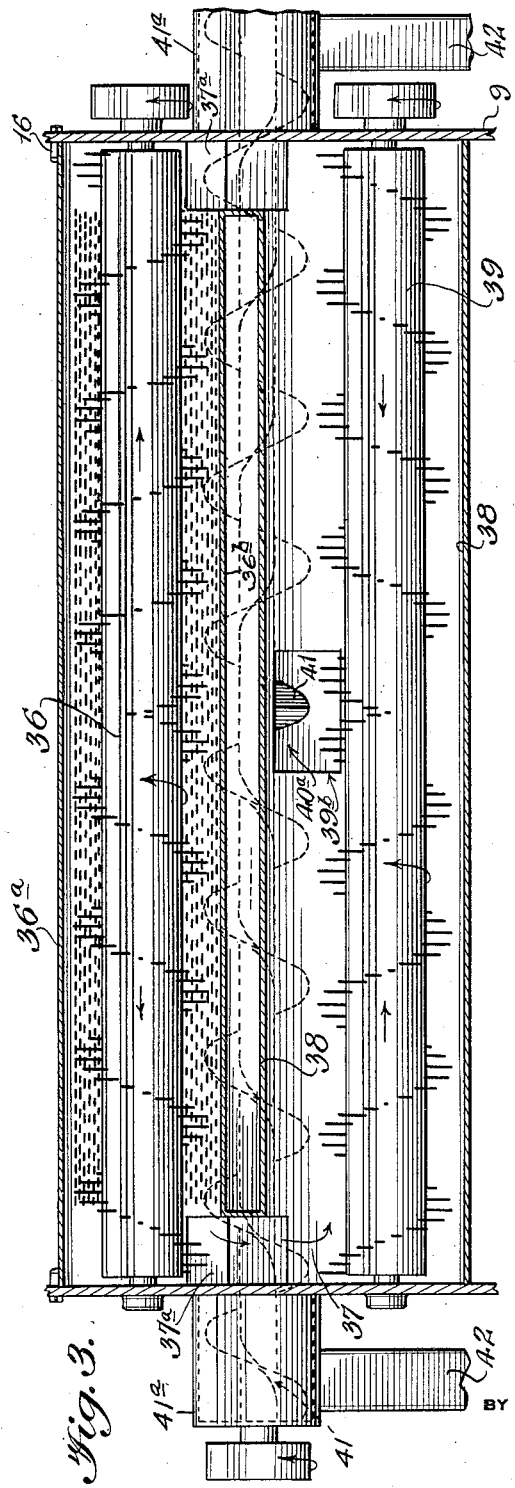
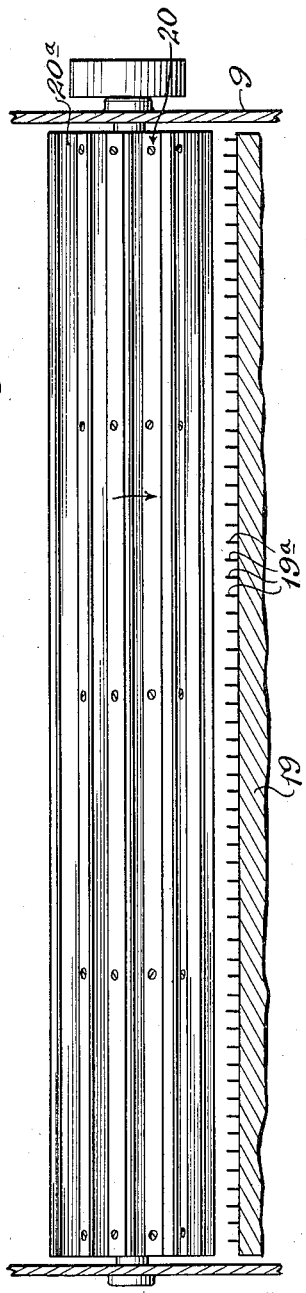
Inventor
Thaddeus S. Grimes
BY Eugene Stevens
His ATTORNEY

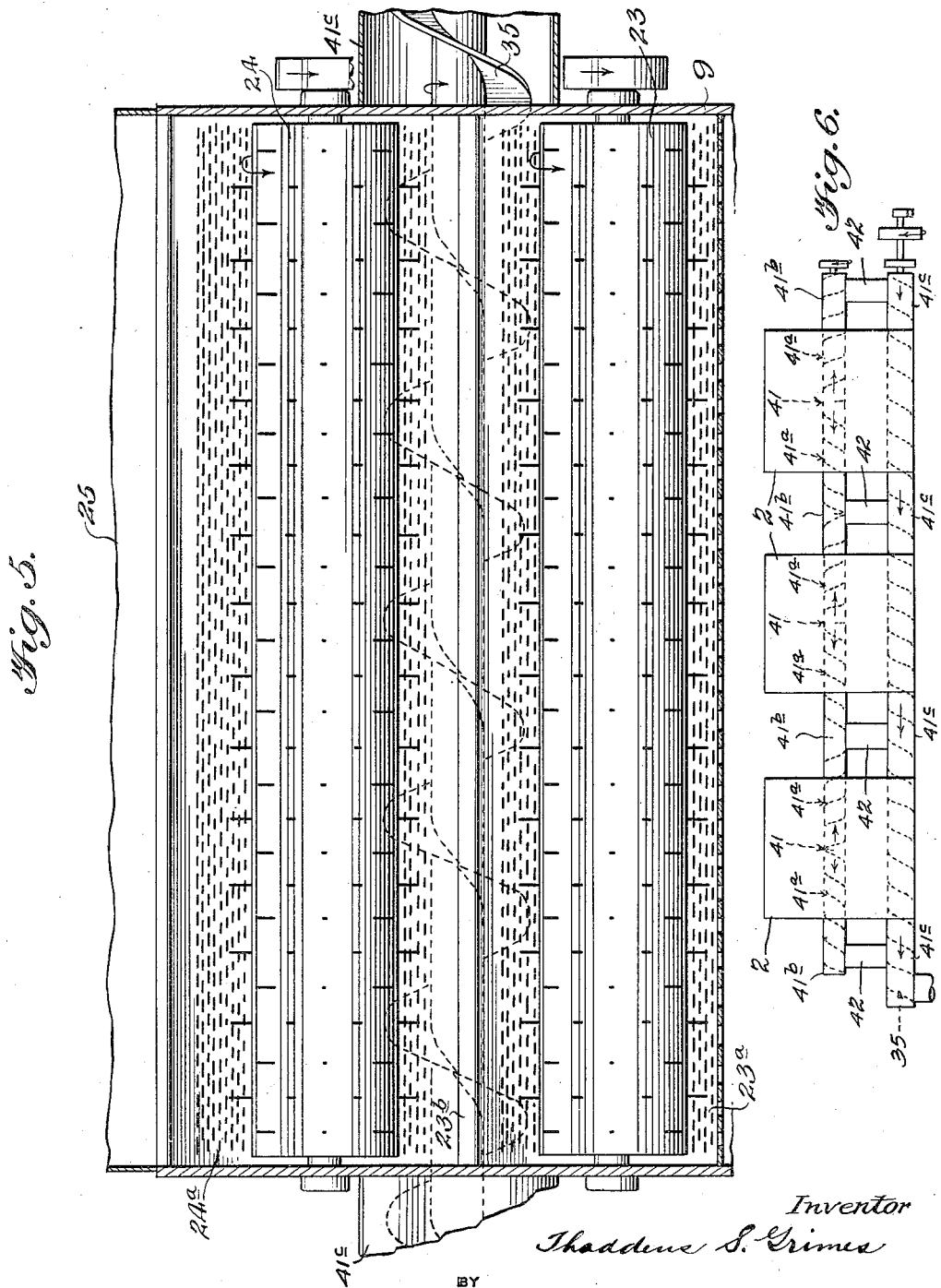

Patented July 23, 1935

2,009,047

UNITED STATES PATENT OFFICE 2,009,047

HULLER FEEDER OR THE LIKE

Thaddeus S. Grimes, Columbus, Ga., assignor to Lummus Cotton Gin Company, Columbus, Ga., a corporation of Georgia Application August 29, 1933, Serial No. 687,364

6 Claims. (Cl. 19—37)

My invention relates to cotton handling apparatus and the like and has particular reference to a novel and improved hull separator-feeder for cotton gins, although it is to be understood that the invention is equally applicable to huller gins, cleaners and hullers, and may have other fields of utility within and without the cotton handling art.

In the handling of cotton one of the primary problems is the elimination of trash and dirt. Especially is this true in the hulling and cleaning operation preparatory to transmittal of the seed cotton to the gin. Cotton coming from the field contains in addition to dirt a varying quantity of broken hulls and trash. When the percentage of dirt, broken hulls and trash is high the hulling apparatus or the hulling feeders of the prior art, as the case may be, have to be run considerably below capacity in order to obtain even reasonably satisfactory results. This is so because the incoming material is indiscriminately subjected to the action of the saw cylinder or equivalent by means of a picker roll or, as in the case of the somewhat analogous hulling and cleaning structure of my prior Huller gin Patent No. 1,244,196, dated October 23, 1917,—by a picker roll conveyor which conveyor works over and delivers to a subjacent picker roll conveyor which likewise throws material to the saws.

It is therefore the primary object of this invention to effect an initial and very substantial separation of fine trash and dirt from the incoming material so as to avoid indiscriminate action of the saw cylinder upon the incoming material with the result that trash will be carried around thereby and mixed with the seed cotton,—and also to prevent congestion of hulls in the inlet of the machine thrown back by the knocker roll or other hull stripping means.

A companion and equally important object of the invention is to provide means for disposing of the said initially separated small trash and dirt and cleaning such cotton as may have been mixed with same, there being means for subsequently presenting such residue of cotton and larger hulls to the saw cylinder.

Another object of the invention resides in the provision of means for redirecting such hulls and material to the saws as shall be stripped from the saw cylinder by the knocker roll or other hull disengaging means.

A further object of the invention is to provide, in a machine of this kind, a by-pass valve means whereby substantially non-hully cotton can, upon being screened, be passed directly to the outlet for transmittal to the gins without trash-removing treatment.

Invention also resides in certain novel deflectors and the arrangements thereof for directing or redirecting material to the saw cylinder in such a way that fine trash and dirt will not be caught by same; and further in the provision of means whereby the air currents set up by rapidly rotating members incorporated in the machine may be employed to help extract dirt from the seed cotton that has been hulled,—the nature of such means being such as to substantially exclude dirt from entry into the hulled seed cotton.

Still another object of the invention is to provide novel means for holding in assembly the various partitions, panels, troughs and other fixed structural units of the device.

The invention also resides in certain novel features of construction, combination and arrangement of the various parts and in modes of operation,—all of which will be readily understood upon reference to the accompanying drawings in connection with the detailed description that follows.

It is understood that the drawings illustrate what is now considered to be a preferred example of the invention. Obviously, however, various departures can be made from the structure illustrated and described, within the spirit and scope of the subject matter claimed hereinafter.

In the drawings, wherein the same reference characters have been used to designate the same parts in all views, Figure 1 is a cross sectional view through the cotton hulling cleaner and feeder which is adapted to be supported upon a cotton gin (not shown), the view having been taken on line 1—1 of Figure 2;

Figure 2 is a sectional view through the machine, taken on the line 2—2 of Figure 1, and illustrating the brush, saw cylinder and certain of the deflectors;

Figure 3 is a sectional view taken on the line 3—3 of Figure 1, showing the two picker roll conveyors and an associated trash conveyor in dotted lines;

Figure 4 is a longitudinal sectional view taken on the line 4—4 of Figure 1 and showing the knocker roll in elevation;

Figure 5 is a sectional view taken on the line 5—5 of Figure 1,—showing the two cleaner rolls and the subjacent trash conveyor;

Figure 6 is an elevational view, largely diagrammatic, for showing a connected series of my machines and especially the dirt conveyor arrangement.

Figure 1:
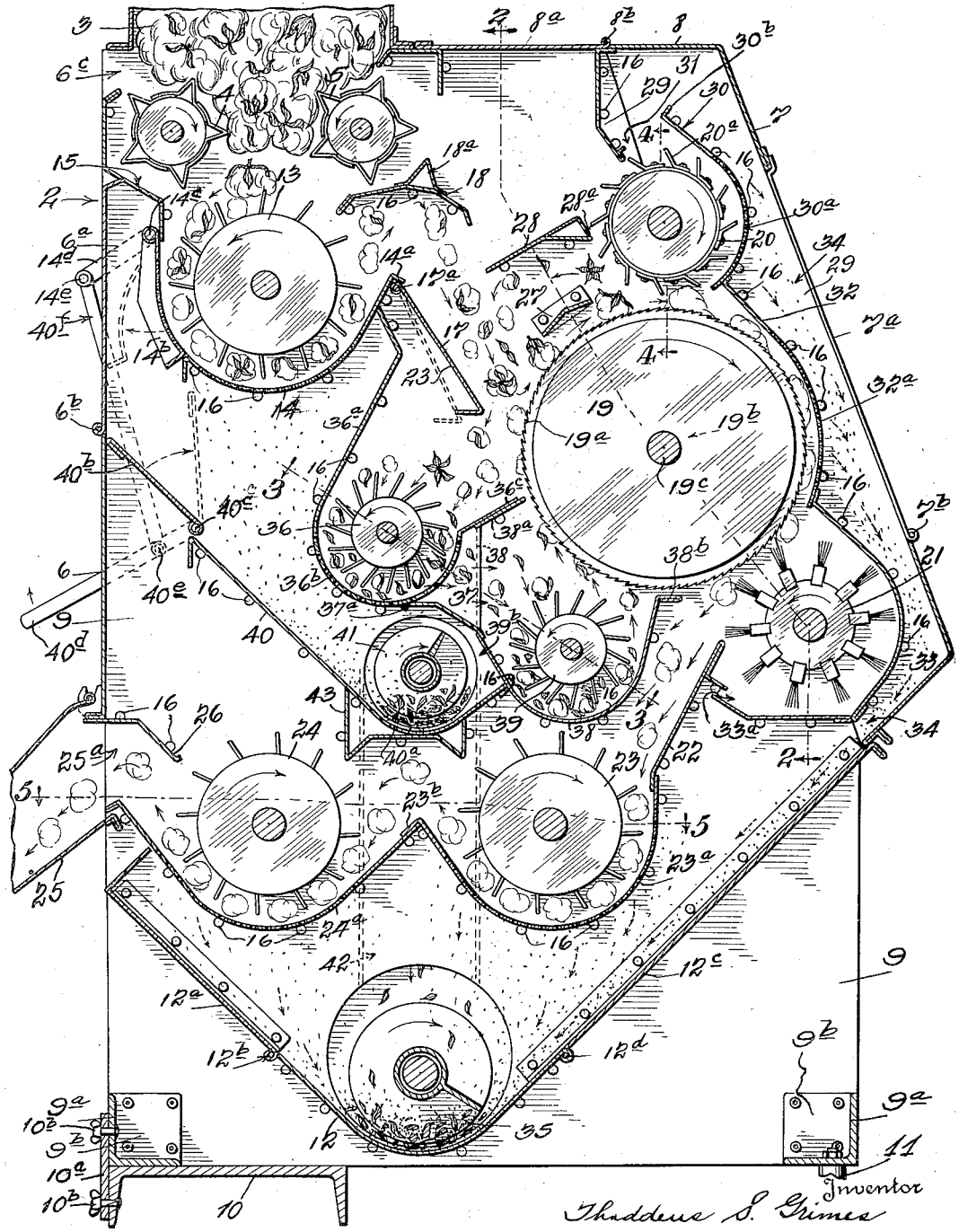

Referring to the drawings, by reference characters which have been used to designate the same parts in all views, numeral 2 denotes the elongated casing having the material inlet 3 in the top wall 8,—said inlet extending substantially throughout the length of the casing 2.

Immediately below the inlet 3 are disposed a pair of coacting feed rolls 4, 5, for feeding the incoming material onto the spiked drum 13 which passes the material into the mechanism containing portion of the machine. The feed rolls 4, 5, and the spiked drum 13 extend substantially throughout the length of the casing 2.

The front wall of the casing 2 is denoted by reference character 6 and has a hinged door or panel 6a which is pivoted to the front wall as indicated at 6b. This door 6a may extend substantially throughout the length of the casing so as to afford access to the drum 13 and associated parts.

The top wall 8 has the door 8a which is hinged thereto as indicated at 8b. The rear wall 7 likewise has a door, indicated at 7a and pivoted to such rear wall as indicated at 7b so as to afford access to the various internal structures of the casing at the rear thereof.

As clearly shown in Figure 1 the bottom of the casing 2 provides the hopper 12 which extends substantially throughout the length of the casing. The front and rear sloping walls of the hopper 12 have doors 12a, 12c, which are pivoted to the hopper as indicated at 12b, 12d, respectively. A dirt conveyor of the screw type, and indicated at 35 extends through the casing and hopper 12 and preferably will extend through a plurality of adjacent casings 2,—it being understood that it is customary to dispose huller-cleaners of this general class on top of the respective gins of a battery.

As illustrated in Figure 1 the end walls 9 of the casing extend below the lower edges of the front and rear walls 6, 7, so as to provide supports for the casing. Opposed lower corners of the respective end walls 9 are connected by means of angle bars 9a for reinforcing purposes, such angle bars 9a having web portions 9b or the like at their ends so as to provide convenient attaching surfaces for abutting the inner surface portions of the end walls 9. The forward one of the angle bars 9a is supported by the top rail 10 of a gin which is in the form of a channel beam. The front angle bar 9a may be connected to gin rail 10 as shown at 10a, 10b, Figure 1. The rear portion of the casing 2 is supported in any preferred fashion and I have shown in Figure 1 one of a pair of posts 11 which will rest on the gin room floor,—the upper end of same being secured to the rear angle bar 9a.

The feed rolls 4, 5, serve to feed the incoming cotton in a bat-like sheet onto the spiked drum 13. The spiked drum 13 rotates very much more rapidly than do the feed rolls 4, 5, and thus said drum 13 cooperates with its subjacent screen trough to effect the rapid pulling of individual locks from the bat and the throwing of same into the hulling portion of the machine.

The screen trough 14 is appropriately carried by the end walls 9 of the casing by means of suitable fastening members 16 which are to be covered in a separate application to be filed. The upper or front edge of the screen trough 14 is preferably provided with a valve or door 14b hinged as at 14c adjacent to and forming a substantial continuation of the inwardly offset portion 15 of the front wall 6, so as to prevent incoming material from being thrown forwardly into the space adjacent the front wall door 6a, except when trough valve or door 14b is opened for this purpose as will be explained later on herein. It is observed that the offset wall portion 15 provides a stop for the rearwardly flanged upper portion of the door 6a as shown in Figure 1.

The rapidly rotating drum 13 throws the locks or wads of material upwardly and rearwardly against the deflector 18 which is secured at its ends to the end walls 9 of the casing at a point below the feed roll 5. The securing means for the deflector 18 comprises the elements 16 to which reference has been made heretofore in connection with screen trough 14. The deflector 18 is angular in cross section so as to present a plurality of deflecting surfaces each of which is calculated to deflect material downwardly and rearwardly to a low point on the saw cylinder 19 as indicated by the arrows in Figure 1. The upper side of deflector 18 has a deflecting portion 18a in the form of an inverted V,—its function being to exclude material from passing forwardly to the feed roll 5 as will be more clearly understood later on.

Figure 1 also illustrates that the rear edge of the trough 14 has a lateral flange 14a overlying the pivoted upper end 17a of a swingable valve member 17 which is in the form of a plate extending between the end walls 9. The valve 17 may be suitably adjusted, as for instance, by a crank or the like at one end of the casing so as to properly dispose the lower edge in reference to the saw cylinder 19. The valve 17 therefore cooperates with the deflector 18 for directing the incoming cotton directly against the low point of the saw cylinder. If the incoming material is dirty and contains considerable trash it will be well to move the valve 17 a greater distance away from the saw so as to more readily permit dirt and fine trash to slide down onto the subjacent and slightly rearwardly disposed spirally flighted picker roll 36 which latter will be referred to more particularly hereinafter.

The saw cylinder 19 is conventional and extends substantially the entire length of the casing. Of course any well known equivalent such as a spike clothed roll may be substituted for the saw cylinder.

The incoming material striking against the lower portion of the saw cylinder results in most of the wholly or partly filled bolls and the larger wads of cotton being caught and carried upwardly by the teeth 19a of same and below the knocker or stripper roll 20 having the vanes 20a, as shown, which are adapted to knock back hulls and trash so as to keep same from passing around with the fiber to be brushed off by the brush 21. Loose trash with some cotton that is not caught by the saw teeth drops onto conveyor 36 for a cleaning and some cotton will be thrown back by roll 20.

The operation of brush 21 is familiar. It rotates much more rapidly than the saw cylinder 19 and brushes the cotton off of the teeth 19a, passing such cotton down the slideway provided by partition 22 and onto the spiked cleaner roll 23 working in the screen though 23a. Dirt remaining in the cotton will be passed out through screen 23a into hopper bottom 12 so that it will slide down into the dirt conveyor 35 at the lower end of the hopper bottom. The cleaner roll 23 scrubs the cotton over the screen 23a and throws it forwardly and upwardly against the deflector 43 which directs such material downwardly and forwardly into the trough 24a within which works a second spiked cleaner roll 24 which throws the cotton forwardly and upwardly through the outlet 25a in the front wall 6 from which it passes to the subjacent gin (not shown) by way of the chute 25 which may be carried by front wall 6 in any preferred manner.

There is, as illustrated in Figure 1, a deflector 26 carried by the end walls 9 and arranged adjacent the outlet 25a and cleaner roll 24 so as to direct material from such cleaner roll toward the outlet 25. This deflector 26 is secured to the end walls by the fastening units 16 heretofore referred to, and it may be mentioned at this time that all of the screens, partitions or troughs are preferably secured by means of the elements or assemblies 16.

As shown in Figure 1 the screen trough 23a has its forward edge terminating in a substantially right angularly disposed flange 23b which overlies the rear imperforate edge part of screen 24a. By this fiber will be prevented from catching at the junction of troughs 23a, 24a, and preventing the free passage of material.

It will be apparent that the rapidly rotating saw cylinder 19 will tend to throw off some material from its teeth 19a before reaching the knocker roll 20. In order to prevent this I provide the deflector 27 which is carried by the end walls 9 and located just forwardly of and slightly below the knocker roll 20 with its deflecting surface providing a passage adjacent the saw cylinder. Thus the deflector 27 directs material thrown from the saws to the knocker roll 20. Furthermore, the deflector 27 provides a clear space thereabove for the passage of material knocked back by the vanes of knocker roll 20.

A second deflector 28 is also shown in Figure 1 arranged in front of the knocker roll 20 and above the deflector 27. The arrows in Figure 1 show how the material knocked off of the saw teeth by the knocker roll 20 is thrown against the deflector 28 whose deflecting surface is so arranged as to direct the deflected material from the knocker roll to a low point on the saw cylinder 19. In other words, the knocked back material from the knocker roll 20 joins the incoming material from deflector 18 in passage to the saw cylinder. Fine trash thrown back by the knocker roll and deflected downwardly by deflector 28 will not catch on the saw teeth 19a but will pass downwardly to the conveyor 36. As will be understood of course some small trash with a few dirty locks of cotton initially introduced into the machine will pass down along valve 17 and onto conveyor 36.

Thus for the most part, material having enough fiber to be engaged by the saws will be initially directed thereagainst and such of the same as is knocked back by knocker roll 20 will, by deflector 28, be again directed against the saws. It is only fine trash and dirt for the most part that will reach the upper picker roll conveyor 36.

The rear edge 28a of deflector 28 will provide slight clearance for passage of the vanes 20a of the knocker roll. In practice it will frequently happen that a wad of cotton or piece of trash thrown off the saw cylinder 19 will lodge between adjacent vanes 20a of the knocker roll and thus will be permitted to pass by the rear edge 28a of deflector 28. In order to prevent material carried past the rear edge 28a of deflector 28 from getting in with the seed cotton I provide the second deflector 29 which is disposed approximately radially of the knocker roll 20 and is spaced a considerable distance from the deflector 28 so as to give the knocker roll time to throw off any material that may be disposed between its vanes 20a before the latter reach the lower edge of deflector 29.

Behind the deflector 29 is a partition 30 having its lower and perforate major portion conforming to the vaned periphery of the knocker roll 20 while its upper end preferably imperforate portion angles off from the periphery of knocker roll 20 to provide a comparatively large air inlet opening 31 between the forward end of partition 30 and the rear surface of deflector 29 for the purpose of admitting air so as to overcome the tendency of the rapidly rotating knocker roll to create a vacuum in front of the lower end of deflector 29. The portion of the partition 30 adjacent the air inlet 31 is imperforate while the remaining portion of said partition 30, amounting to about two-thirds of the area, of it is perforated as indicated at 30a. The reason for this partition construction 30, 30a, is to provide for the discharge through the perforated portion 30a of any dirt that may be drawn around by the vanes 20a of the knocker roll 20. But the perforations of the portion 30a of partition 30 are sufficiently small to prevent any cotton fiber from being blown therethrough. Any small locks of cotton fiber that may have succeeded in passing the rear end 28a of deflector 28 and the lower end of deflector 29 will thus be returned to the saw cylinder at the lower end of the partition 30, 30a, where it joins with the partition 32 which is disposed in back of and close to the periphery of the saw cylinder 19.

Adverting to the knocker roll 20 and its partition 30, 30a, the air drawn in through opening 31 will circulate out through the openings in partition 30a of the partition and back up to opening 31 again allowing dirt and trash to fall downwardly through the space 34 behind the partitions 30, 32, and ultimately reach the dirt and trash conveyor 35 in the hopper bottom 12 of the casing. The rearwardly turned upper end of the imperforate portion of partition 30, coupled with the fact that it is located considerably above the knocker roll 20 and the lower end of deflector 29, substantially prevents return of loose dirt and trash with the air current through opening 31.

The partition 32 is closely spaced to the saw cylinder 19 so that the fiber carried by the saw teeth 19a will be scrubbed against such partition and such dirt as may be loosened will be drawn out through the apertured lower portion of the partition 32a of such partition. Only the lower portion of the partition 32 is apertured so as to avoid transmittal of dirt screened out by the portion 30a of partition 30, from getting into the seed cotton carried by the saw cylinder.

The lower end of the partition 32 behind the saw cylinder joins with the upper edge of the partition 33 which partially encloses the brush roll 21. The partition 33 of the brush roll is imperforate and may of course be made in several sections if desired.

Particular attention is directed to the fact that the partition 33 of the brush roll 21 provides at its lower edge and at a point adjacent the side or plate 22,—an air inlet opening 33a for supplying air to the brush 21. The brush 21, inasmuch as it is of more openwork construction than the knocker roll 20, will create a greater draft than will the knocker roll 20. By supplying air to the brush 21 at the point 33a, indicated, the brush will cause a down draft of air in the space 34 behind the partition 32, 32a which backs the saw cylinder and will thus effect a pulling of dirt and trash through the apertured lower portion 32a of such saw cylinder partition.

Special attention is directed to the fact that the opening 33a into the brush chamber is located so as to substantially avoid drawing trash and dirt into the brush chamber. In other words, the trash and dirt drawn from space 34 by the suction at the brush chamber inlet 33a will be permitted to drop out of the air current and pass to the dirt conveyor 35.

The blast of air from the brush 21 accelerates the discharge of the seed cotton down the slide 22 to the cleaner roll 23, most of the air so discharged circulating back through the openings in the trough 23a below cleaner roll 23 to the brush chamber inlet 33a.

The spiral conveyor 36 to which reference has previously been made receives, as has been mentioned, dirt and loose trash from the feeder drum 13 as well as from the knocker roll 20, it being understood that such material will not readily catch upon the saw teeth 19a because of the fact that in both instances the material is knocked against a low point on the cylinder approximately tangentially of the cylinder. Such loose trash and dirt drops down onto the plate 36c which is an extension of the rear edge of the perforated trough 36b which is disposed beneath the conveyer 36. This trough 36b has its forward portion provided with an upwardly and rearwardly extending wall 36a so that the frontal or outer surfaces of such portion 36a will provide a forwardly inclined slide to direct siftings from the trough 14 below the feeder roll 13, toward a dirt conveyor 41. This dirt conveyor 41 is located below the trough 36b and there is an inclosed partition 40, 40b, extending downwardly and rearwardly from the front wall 6 and under the dirt conveyor 41 to provide an imperforate trough 40a beneath such dirt conveyor 41. This partition 40, along with the other partitions and troughs to which reference has been or will be made is secured to the end walls 9 by means of the fastening elements 16 to be described later.

Partition 40, 40b, incorporates the door or valve 40b which is pivoted as at 40c in end walls 9. Such door 40b and door 14b in the superjacent trough 14 (see Figure 1) are adapted to be simultaneously opened and closed by lever 40d which is keyed to door pivot 40c at one end of machine and has the pivoted link connection 40f, 40e, 14e, with the arm 14d which is keyed on trough door pivot 14c. When doors or valves 14b, 40b, are open spiker roll 13 discharges the screened incoming cotton directly down on to roll 24 which carries it over screen 24a and out of machine. Reasonably clean cotton can be treated thus and need not be subjected to the complete treatment that the machine affords.

Particular emphasis is directed to the fact that the conveyor 36 is so arranged it will not throw material against the saw cylinder 19 but rather will simply convey such dirt and trash with the scattering of cotton that it receives, toward the ends of the casing. The lost trash and dirt will, for the most part, be sifted out through the openings in the trough 36b so that the residue remaining and reaching the ends of the trough will be in a fit condition to be thrown to the saws by the second picker roll conveyor 39.

As shown in Figure 3 and also indicated in Figure 1 the trough 36b below conveyor 36 is cut away at its ends and receives the chute plates 37a providing passages 37 for the discharge of the residue of material from conveyor 36 into the second picker roll conveyor 39. This second picker roll conveyor 39 is disposed below the saw cylinder and preferably slightly forwardly of the axis thereof as shown in Figure 1,—there being a trough 38 below the conveyor 39 provided with openings at its ends for receiving the chute plates 37a as illustrated. The forward portion of the trough 38 terminates in the upwardly and rearwardly extended flange portion 38a which cooperates in supporting the rearwardly and upwardly extending plate portion 36c of the trough 36b of conveyor 36.

The trough 38 has its rear edge doubled for stiffening purposes as indicated at 38b, and this rear edge is turned rearwardly and spaced from the saw teeth 19a so as to provide clearance therebetween and at the same time prevent seed cotton, thrown off the saw teeth by the brush 21, from getting into the trough 38.

The trough 38 below the conveyor 39 is imperforate and has a central opening 39b discharging into the trough 40a of the dirt conveyor 41,—it being noted that the rear edge of the trough 40a is secured to trough 38 and preferably by fastening members 16 as indicated in Figure 1.

The conveyor 39 as indicated by the arrows in Figure 1 throws material against the saw cylinder while conveying toward the central outlet 39b. Thus it will be evident that substantially all fiber will be reclaimed and the material discharged from the second conveyor 39 through the central outlet 39b to the dirt conveyor 41 will be practically all trash such as hulls. Practically no loose dirt will reach the conveyor 39 as same will have been sifted out through trough 36b by the scrubbing action of conveyor 36.

Of course such cotton as reaches the conveyor 36 whether in the form of occasional wads, or otherwise, is so dirty that it is not fit for presentation to the saws. The primary function, therefore, of conveyor 36 is to get rid of the dirt and small trash so that the material discharged to conveyor 39 will be in a fit condition for final presentation to the saws.

The dirt conveyor 35 which is in the hopper bottom 12 will, as stated, preferably extend through a whole series or battery of machines (see Figure 6). The upper dirt conveyor 41 in the trough 40, 40a, may also extend through the series or battery of machines, also as shown in Figure 6. The upper dirt conveyor 41 preferably provides within each machine casing oppositely directed spiral flights 41a for conveying material toward opposite ends of the machine to troughs such as 41b which connect adjacent machines and from which lead chutes 42 (see Figure 6) connecting such dirt conveyor 41 with the trough connection 41c which houses the conveyor 35 between adjacent casings. In this way the dirt and trash will be concentrated in the lower conveyor 35 so that it may be more readily removed. Also by having upper dirt conveyor 41 convey in opposite directions within each machine casing 2 dirt and trash will be quickly removed without clogging and conveyor 41 may be of small size.

The operation of the machine will doubtless be understood from the foregoing description. However, it may be briefly summarized as follows:

The rapidly rotating spiked drum 13 picks and separates out from the bat of incoming cotton, individual locks or bunches which are thrown against the deflector 18 which rains the material down into what substantially amounts to tangential engagement with the teeth 19a of the saw cylinder 19. It should be clearly understood that the material is not fed down in a mass but rather the feed to the saws from deflector 18 is scattering. As stated, the material from deflector 18 is rained down to engage the saws.

Of course there will be some loose dirt and fragments of hulls together with some cotton that will not catch on the saws. This passes down to the conveyor 36 which screens out the fine trash and discharges at its ends onto conveyor 39. Conveyor 36 simply cleans the material of dirt and fine trash. It does not throw material against the saw cylinder.

The deflector 27 not only prevents material from being thrown off of the saw cylinder 19 and into the path of the material thrown back by the knocker roll 20, but also prevents the knocker roll from actuating material back onto the saw cylinder at a point close to the knocker roll; and thus prevents congestion below the knocker roll in addition to keeping loose trash off of the saw cylinder as it will be obvious that loose trash and dirt falling on the top portion of the saw cylinder would be very apt to pass around with the seed cotton and avoid the action of the knocker roll 20.

The arrangement of deflector 28 is such that material thrown back by the knocker roll is rained down to substantially tangential engagement with the saws along with the new material being deflected down by the deflector 18.

Thus we have, by virtue of the deflectors 18, 27, 28, a continual throwing of both new and knocked back material to the saws at a low point thereon so that the finer trash will not be caught by the saws but will fall down into conveyor 36.

The valve 17 will be regulated according to whether the percentage of hulls and trash in the incoming material is high or low. The dotted lines in Figure 1 illustrate this.

The siftings from the screens 14, 36b, are caught in the dirt conveyor 41 along with the residue of the hulls and trash which is discharged thereinto from the central outlet 39b of the imperforate trough 38 below picker roll conveyor 39. The conveyor 39, it will be remembered, receives the cleaned residue of material from conveyor 36, and repeatedly throws it against the saws while conveying from its ends toward the center outlet into dirt conveyor 40, as stated.

There are two currents of air circulating through portions of the area 34 in back of partitions 30, 32, 33. The first current is generated by the knocker roll and its circuit is through the inlet opening 31 in back of deflector 29, and through openings in the partition portion 32a from which it passes back to inlet 31, trash having a tendency to drop out of the air current at the lower portion 30a of partition 30.

The second air current circuit includes the brush casing 33 into which air is drawn through the inlet 33a, the current passing down into trough 23a and out through the perforations thereof back to inlet 33a. However, the brush creates a partial vacuum in the space 34 in back of the apertured partition portion 32a which is behind the saw cylinder, thus drawing dirt from the seed cotton as it is scrubbed over the partition 32, 32a, in rotation of the saw cylinder. The location of the air inlets 31a, 33a, to which reference has been made is such that a minimum of dust will be drawn therethrough. In other words, in each instance the air currents take a short turn in a direction contra to the action of gravity so as to give particles a chance to fall out of the currents and reach the dirt conveyor 35 at the bottom of the casing.

Also, as mentioned heretofore when clean and substantially non-hully cotton is to be run through the machine, lever 40d (Figure 1) can be swung out to simultaneously open the valves or doors 14b, 40b (Figure 1) so that the cotton that has been screened by roll 13, operating over screen 14 will be dropped onto roll 24,—rescreened over screen 24a and passed out of the machine to the gin.

Having thus described the invention what is claimed as new is:

1. In a cotton huller or the like, a driven feeding means, a driven cotton engaging means, a hull disengaging means for removing trash from the cotton on said cotton engaging means; the combination of deflecting means adjacent and inwardly of said feeding means for directing the incoming material substantially tangentially toward said cotton engaging means at a point remote from said hull disengaging means, a cleaner-conveyor adjacent said cotton engaging means and receiving such incoming material as is not caught by same, means for restraining material received in said conveyor from being thrown against the cotton engaging means, and a second conveyor receiving cleaned material from said first conveyor and arranged to convey such material lineally of the cotton engaging means while actuating it thereagainst.

2. In a machine of the class described having a driven cotton engaging means, a driven hull rejecting means cooperating therewith, spaced deflector means associated with said hull rejecting means, a partition partially surrounding said hull rejecting means and having an apertured portion, an air inlet between one of said deflectors and said partition whereby to at least very materially reduce the creation of a vacuum behind said particularly mentioned deflector means, the apertured portion of said partition permitting loose fine material to be blown therethrough by the hull rejecting means.

3. In a machine of the class described including a cotton engaging means, a hull rejecting means, the combination of a partition adjacent said cotton engaging means and having an apertured portion, and a draft creating means for removing seed cotton from said cotton engaging means, said draft creating means including an inlet communicating with the space behind the apertured portion of the partition that is adjacent the cotton engaging means, and said partition extending between the hull rejecting means and the draft creating means.

4. In a device of the class described comprising a casing having a driven brush roll and superjacent driven seed cotton extracting means, partition means behind said driven extracting means and adjacent the rear wall of said casing and providing a dirt passage therebetween, a dirt chamber in the bottom of said casing, said partition having a perforated area adjacent said cotton extracting means and superjacent to said driven brush roll, a cleaning means including a substantially imperforate plate, receiving seed cotton driven and blown from said brush roll and a screen receiving material from said plate, said partition extending under said brush roll to a point remote from said rear casing wall and adjacent said plate so as to provide an air inlet to said brush roll whereby the rotation of the latter will draw dirt through the apertured partition portion opposite said cotton extracting means and down said dirt passage to said dirt chamber while permitting air to circulate from said screen and dirt passage to said air inlet.

5. In a device of the class described comprising a casing having a driven brush roll and superjacent driven seed cotton extracting means, partition means behind said driven extracting means and adjacent the rear wall of said casing and providing a dirt passage therebetween, a dirt chamber in the bottom of said casing, said partition having a perforated area adjacent said cotton extracting means and superjacent to said driven brush roll, said partition extending under said brush roll to a point remote from said rear casing wall and thereat providing an air inlet to said brush roll whereby rotation of the latter will draw air and dirt through said perforated area of said partition and down said dirt passage and permit dirt to drop to said dirt chamber while air is drawn inwardly away from said rear casing wall to said inlet.

6. In a cotton huller or the like, a saw cylinder, a feeder roll, means for guiding material from the feeder roll to said saw cylinder, a trough under said guiding means for receiving material not caught on the saw cylinder, said trough being disposed to one side of the lower portion of the saw cylinder, means for varying the position of said guiding means relative to the saw cylinder an inclined catch plate spanning the space between the edge of said trough and the saw cylinder, and means for conveying material collected in said trough into engagement with said saw cylinder at a point below said trough.

THADDEUS S. GRIMES.